Dec. 26, 1950  A. M. CAMERON ET AL  2,535,836
METHOD OF AND APPARATUS FOR SOLDERING
THE SIDE SEAMS OF CAN BODIES
Filed Oct. 8, 1947  4 Sheets-Sheet 1
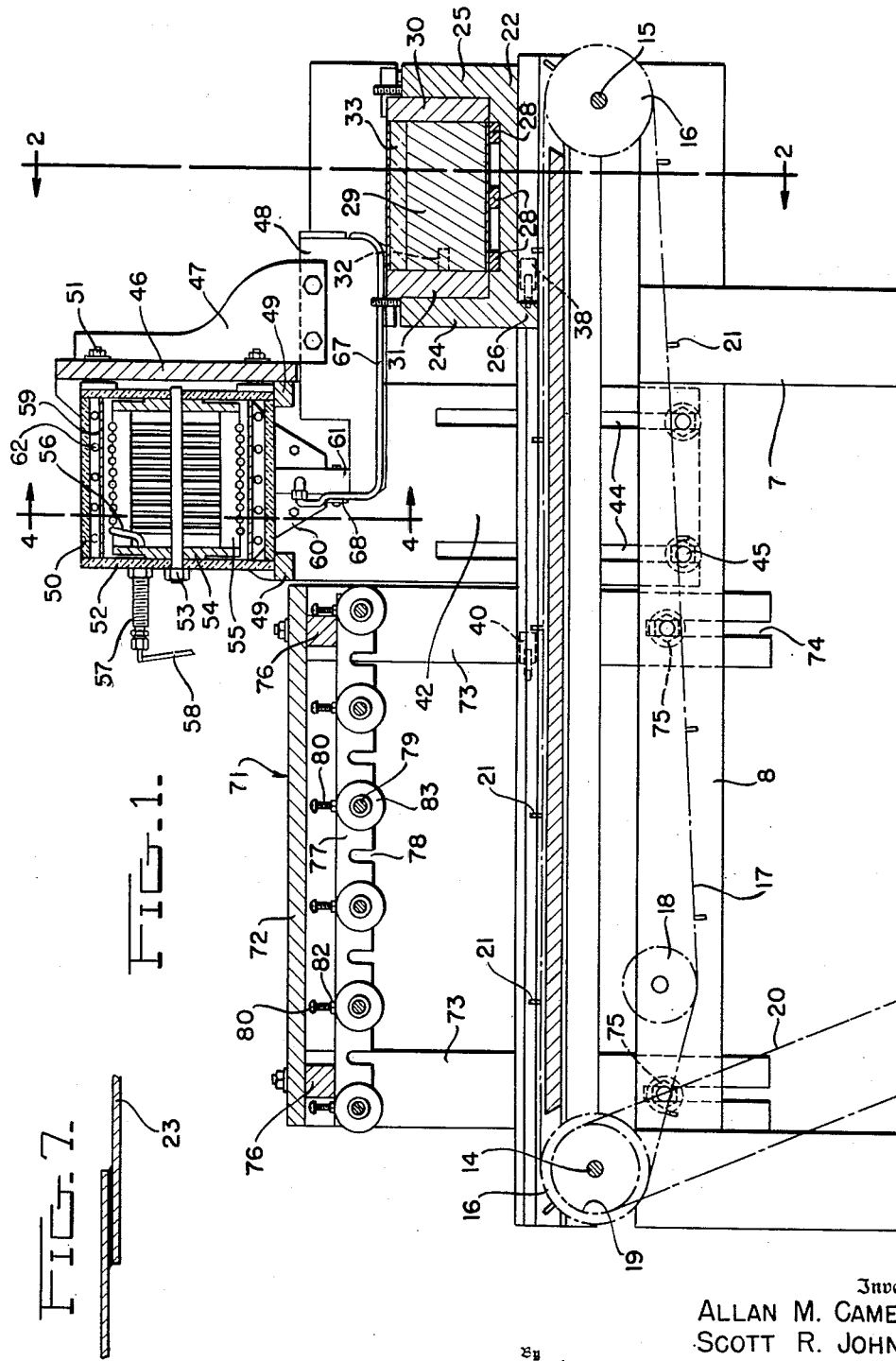
Inventors
ALLAN M. CAMERON
SCOTT R. JOHNSON
By
Mason, Porter, Diller & Stewart
Attorneys

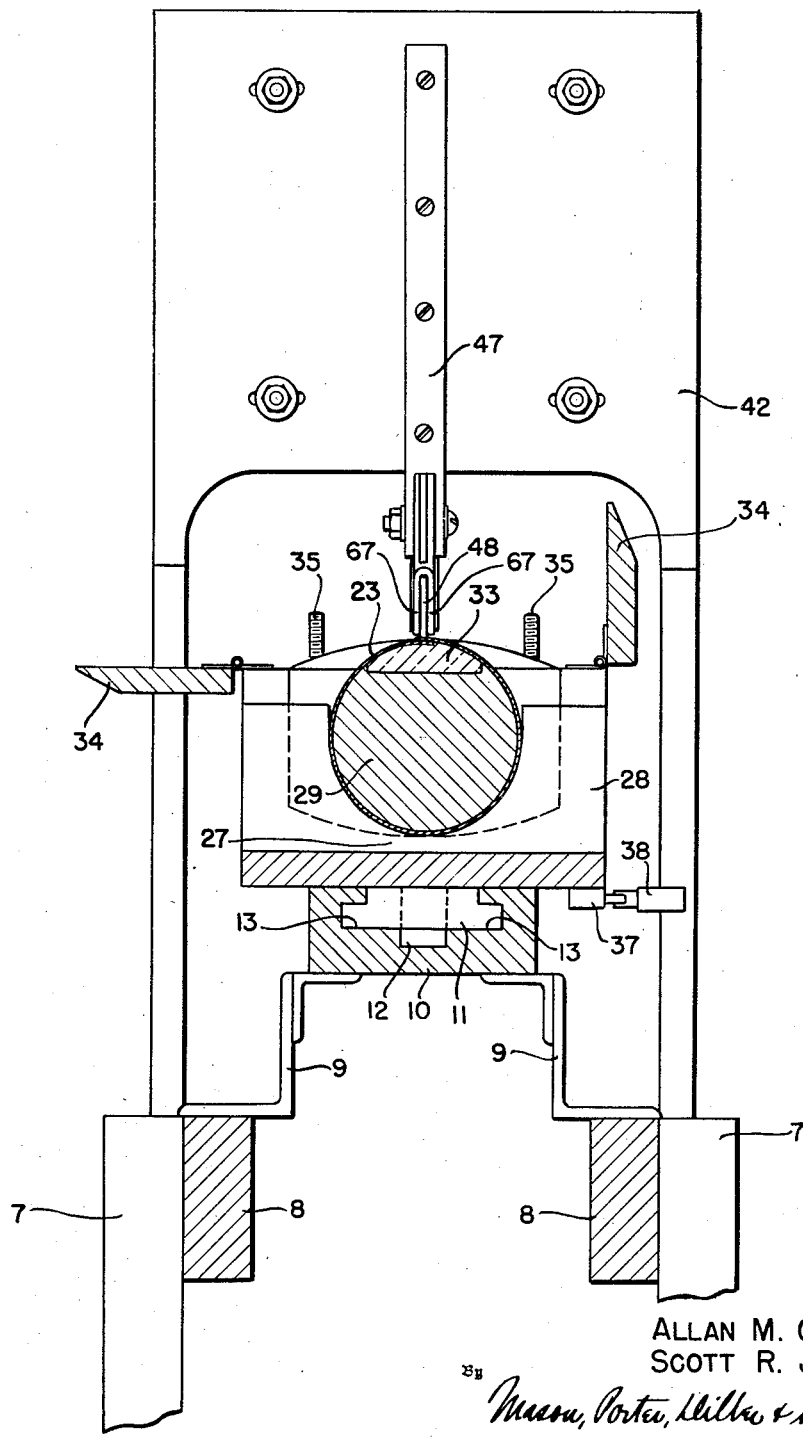

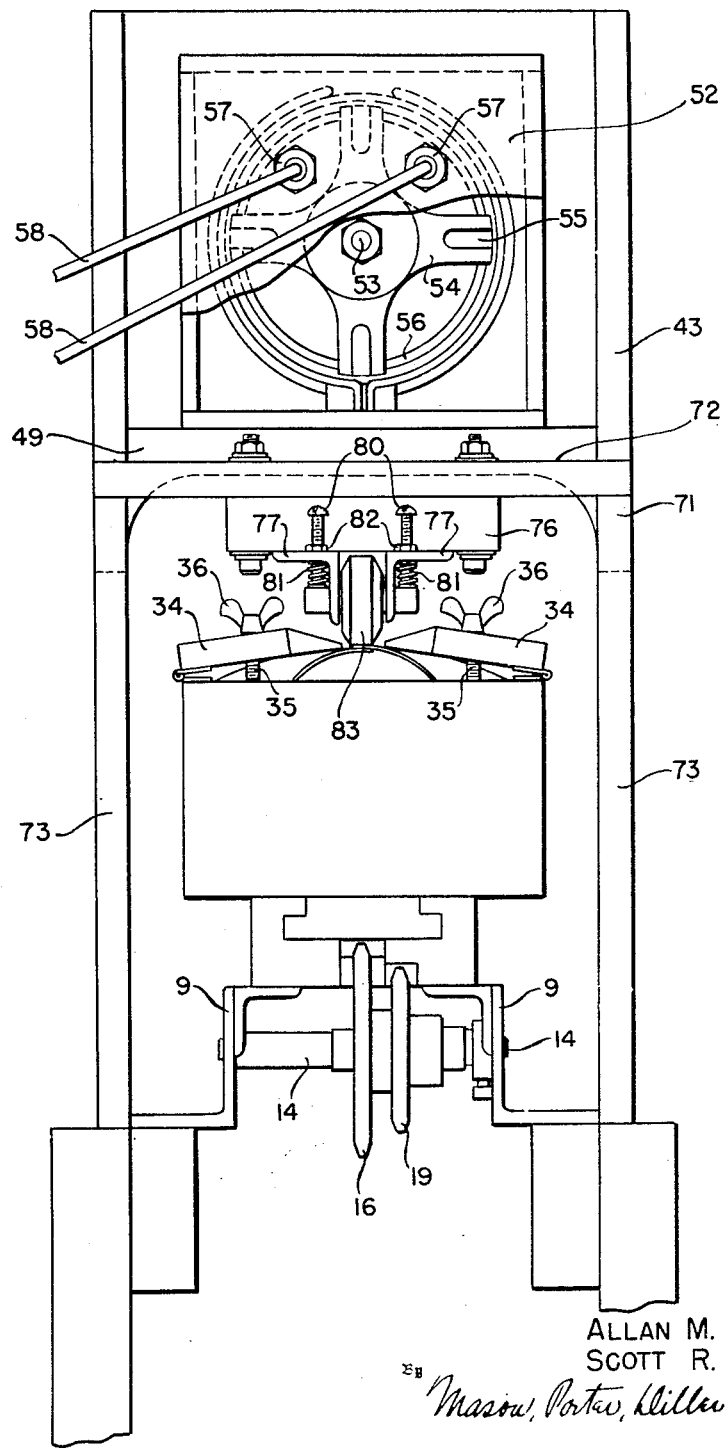

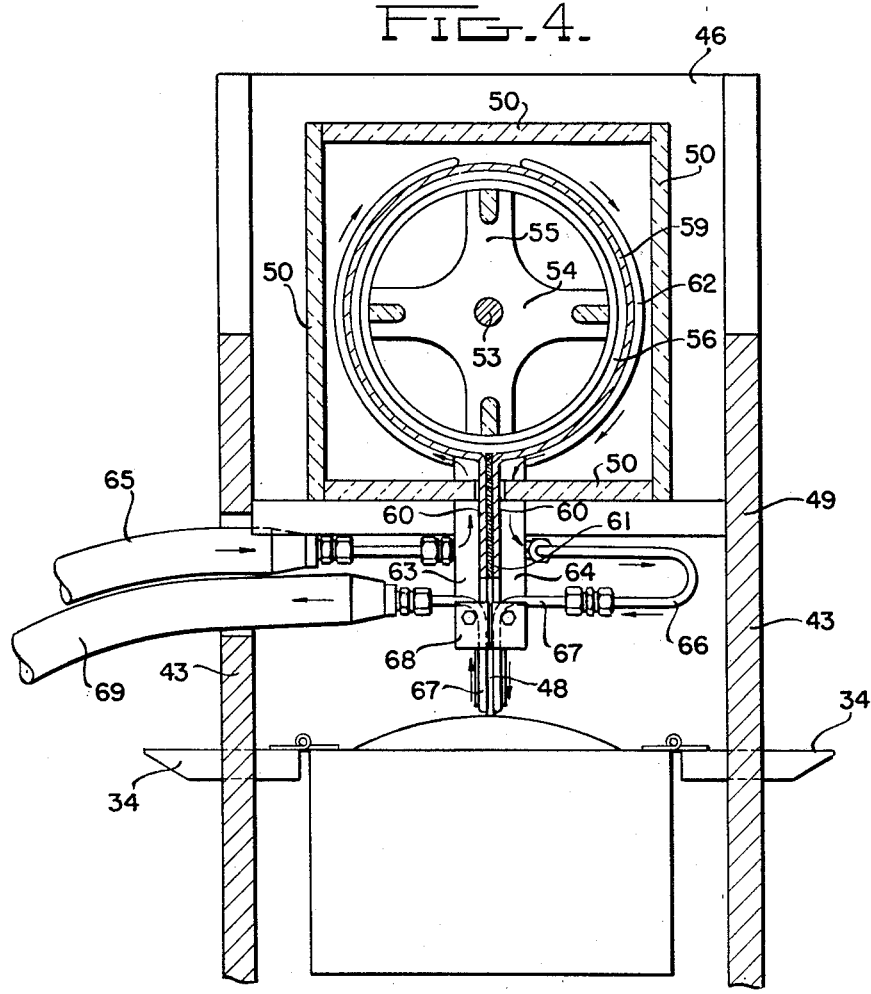
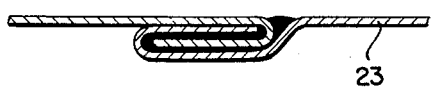
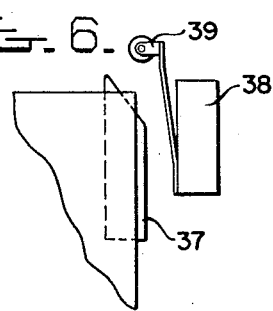
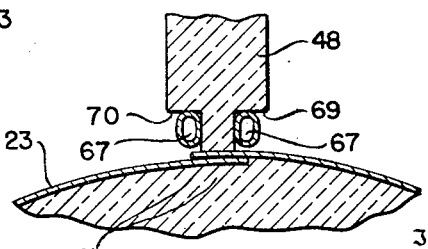

Patented Dec. 26, 1950

2,535,836

UNITED STATES PATENT OFFICE 2,535,836

METHOD OF AND APPARATUS FOR SOLDERING THE SIDE SEAMS OF CAN BODIES

Allan M. Cameron and Scott R. Johnson, River Forest, Ill., assignors to Continental Can Company, Inc., New York, N. Y., a corporation of New York Application October 8, 1947, Serial No. 778,546

2 Claims. (Cl. 219—6)

The invention relates to new and useful improvements in a method and apparatus for bonding the side seam of a metal can body whether the seam be of the lap seam type or the lock and lap seam type.

The present commercial methods of bonding the side seam of either type of seam is to apply molten solder to the exterior of the can body, alongside of the seam which has been flux and preferably pre-heated and depends upon the solder sweating into the seam. The amount of solder flowing into the seam by the method stated is not uniform for each can nor does it penetrate a uniform distance into the seam and often there are islands within the limits of the seam where there is no bonding solder. The result is that such a bonded seam is not of maximum strength and may under strain break down.

Furthermore, when solder is applied to the external surface of the can body, only a relatively small portion of solder sweats into the seam and the remainder adheres to the can body. Some of the surplus solder can be reclaimed by wiping rolls but at the best much solder is wasted and the wiping leaves an unsightly appearance. The use of the wiper rolls also brings its difficulties in that solder clinging to the roll is thrown therefrom by centrifugal force into the path of the approaching can bodies or is scraped by the can body from the roll and thus solder particles are lodged on the interior of the can body which is very objectionable.

When the outside of can bodies are lithographed or decorated and solder bonded by the conventional methods referred to, the lithography must terminate short of the seam so that it is out of the range of the heat and the molten solder, otherwise the lithography will be burned or blistered and thereby produce unsightly cans unacceptable to the trade. Corresponding conditions are encountered when it is desired to protect the entire outside of the can body with a protective lacquer. Therefore the commercial practice is to terminate the lacquer short of the seam and leave from ½ to ⅝" uncoated and after soldering apply a coating of protecting lacquer to the uncoated area.

An object of the invention is to provide a method of bonding the side seam of can bodies of either the lap type or lock and lap type wherein the bonding materials are placed within the limits of the side seam during the makeup of the can body and the bonding of the seam is accomplished by high frequency induction heating applied to the seam parts. This makes it unnecessary to apply solder to the exterior of the can body and the wiping of the can seam and the waste of solder is avoided.

A further object of the invention is to provide a method of the above type wherein pressure is applied to the seam parts during heating so that the bonding materials when reduced to fluid or plastic form are uniformly distributed throughout all parts of the side seam. This will produce a bonded seam of uniform and maximum strength for a given bonding material.

A further object of the invention is to provide a method of the above type wherein pressure is maintained on the seamed parts after heating until the bonding materials have cooled and set and the bonding of the side seam completed.

A still further object of the invention is to provide a method of the above type wherein the heating coils of the induction heating unit extend parallel to the path of movement of the side seam and are disposed over and in close proximity to the side seam so as to avoid overheating and avoid scaling or burning the thin metal parts at the sides of the seam.

A further object of the invention is to provide a method of the above type wherein the entire outer surface of the can body may be lithographed and decorated or coated with a protective lacquer while the body blanks are in sheet form and such lithographing or lacquer coating will be undisturbed by the subsequent bonding of the side seam.

A still further object of the invention is to provide a method of bonding a side seam wherein the bonding agent may be a metal such as solder, a thermoplastic resin such as the polyvinyl acetate resins, or any other suitable heat sensitive bonding material.

These and other objects of the invention will in part be obvious and will in part be hereinafter more fully disclosed.

The accompanying drawings illustrate an apparatus embodying novel features of the invention, and which apparatus has been utilized for successfully carrying out the improved method.

In the drawings:

Figure 1 is a vertical longitudinal section taken centrally of the machine;

Figure 2 is a transverse vertical section on the line 2—2 of Figure 1;

Figure 3 is an end elevation of the machine;

Figure 4 is a transverse vertical section on the line 4—4 of Figure 1;

Figure 5 is a fragmentary transverse section through a lap seam can body showing a portion of the supporting carrier and a portion of the heating units;

Figure 6 is an enlarged plan view of the means for controlling the heating circuit;

Figure 7 is a sectional view taken transversely of a lap seam produced on the illustrated apparatus by the improved method; and Figure 8 is a sectional view taken transversely of a lock and lap seam which can be produced on the illustrated apparatus with slight changes therein and by the improved method.

The novel steps in the improved method of bonding the side seam of a can body are substantially the same for a lap seam or a lock and lap seam can body. If the lap seam body is to be formed, the body blank is prepared in the usual way. The bonding materials are applied to one or both of the marginal edges of the body blank so as to be confined within the lap seam when made up. The bonding material may be in the form of particles of solder mixed with a flux which serves as a means for adhering the bonding material to the body blank or the bonding material may be made in strip form and adhered to the body blank, or if a thermoplastic bonding agent is used, then the material itself will adhere to the body blank. A resinous bonding substance may also be applied in the form of an emulsion, solution suspension or melted condition. It is essential that the material be placed on the body blank in a region so that when the seam is made up, the bonding materials will lie between the lap sections and within the confines thereof. The same is true of a lock and lap seam can body. The body blank is prepared in the usual way for a lock and lap seam and the bonding material is applied to the body blank after which the blank is formed into body shape, the hooks interlocked, and the seam bumped. After the can body has been made up, it is then conveyed through a heating zone. The conveying means may be of any desired type. The heating unit is of the well known high frequency induction type and includes coils which extend parallel with each other in spaced relation and along the path of movement of the seam of the can body. These coils are preferably disposed over and in close proximity to the side seam so as to concentrate the induction heating to the area including the seam parts and immediately adjacent thereto in order to avoid overheating the thin metal near the seam. As the can body moves beneath the induction coils, the alternating magnetic disturbance within the metal parts will heat the same and reduce the bonding material to fluid form. The heating unit includes a presser shoe which engages the seam parts longitudinally of the seam and forces said seam parts into intimate contact during the heating of the seam. The pressure against the side seam during this heating distributes the bonding material throughout all the parts of the side seam, thus producing a uniform bonding of the side seam and a seam of maximum strength for a given bonding material.

After passing the heating unit where the bonding material is transformed to an adherent state, the can body passes beneath pressure means which holds the seam parts in intimate contact with the bonding material until the bonding material is cooled and set and the bond completed.

The improved method will be better understood by a description of the illustrated apparatus which has been successfully used in forming a lap seam can body by the improved method.

The apparatus includes a supporting frame 7 which includes a pair of side rails 8, 8, inwardly directed angle bars 9, 9 having oppositely disposed horizontal flanges forming a support for a track 10 which extends longitudinally of the frame from end to end thereof. This track 10 has a longitudinal conduit 11 with a center groove 12. The conduit is rabbeted to form opposite guide grooves 13, 13.

At one end of the frame there is a drive shaft 14 journaled transversely in the angle bars 9, 9. An idle shaft 15 is also journaled between the angle bars 9, 9 at the opposite end of the frame. Each shaft carries a sprocket 16. A sprocket chain 17 has its upper run in the center groove 12. The chain runs over the sprockets 16 and the slack in the lower run is taken up by the idler 18.

A drive sprocket 19 is also keyed to the shaft 14 adjacent the sprocket 16. Drive sprocket 19 carries an endless belt or chain 20 which is appropriately driven at constant speed by an electric motor and speed reducer not illustrated.

Lugs 21 are suitably spaced along the conveyor chain 17 and project upwardly in the conduit 11.

A carrier 22 moves slidably along the upper surface of the track 10. This carrier is the conveyor for the formed can body, and presents the can body first to the heating unit where the bonding material is rendered fluid and then to the cooling section where the bonding material is set and the bond completed. The carrier has a front wall 24, a rear wall 25 and open sides. The front wall 24 has a foot 26 of T-form in cross section and which fits within the conduit 11 and grooves 13, 13.

The blank is supported in the carrier by means of a cradle 27 consisting primarily of ribs 28, 28. These ribs have a central recess conforming to the cross-section of the can body.

In making a lap seam can body the blank may be wrapped around a removable core 29. The core has a fixed end 30 which is positioned beyond one end rib 28. The opposite removable head 31 fits behind the forward wall 24 of the carrier. A pair of registering pins 32 holds the removable head 31 in the desired position over the end of the core 29.

In order to prevent dissipation of heat or damage to the core, the latter carries an insulating insert 33 of glass bonded mica which forms a sector of the upper portion and extends longitudinally of the core for the distance occupied by the body.

Clamping bars 34, 34 are hinged on the front and rear walls 24, 25 and may be brought down over the can body near the overlapping seam as shown in Figure 3. Bolts 35 extend loosely up through slots or holes in the clamping bars 34 and receive wing nuts 36 by means of which the clamping bars may be tightened against the can-body blank and thus hold the overlapping margins pressed against an intervening ribbon, layer or deposit of bonding material.

Such a deposit of bonding material is preferably applied to one marginal end of the blank before the latter is shaped into body form and placed on the core.

Along one side edge the carrier has a shoe 37 with a beveled face. Suitably mounted on a portion of the support opposite the shoe and at the front end of the track 10, is a precision electric switch 38 having a rock arm 39 normally in the path of a shoe 37. As a lug 21 engages the foot 26 of the carrier it causes the shoe 37 to move the rock arm 39 and thus close the precision switch 38 for energizing the induction heating unit.

As the carrier is advanced beyond the heating zone, the shoe 37 contacts the rock arm of a second switch 40. This second switch serves to interrup the heating circuit.

The heating unit is mounted on a superstructure 42, which includes side members 43. The side members are slotted at 44 and bolts 45 passing through the slots secure the side members to the rails 8, 8. The front plate 46 extends transversely of the superstructure 42 and is secured to the side members 43, 43. A center web 47 extends vertically from the front plate and has a lower shoe 48. This shoe 48 extends a considerable distance longitudinally in each direction from the front plate 46. The shoe 48 is made of glass bonded mica and as shown in Figure 5 rests with a light pressure against the upper marginal edge of the can blank.

Two transverse bars 49, 49 extend horizontally between the sides 43, 43. They serve to support a transformer housing 50. The housing is bolted to the front plate 46 as indicated at 51. The housing includes a back end plate 52 held in place against the front of the housing by means of a center bolt 53.

The center bolt 53 forms a support for a spider 54 having a plurality of arms terminating in radial notched bars 55.

This spider is a support for a primary coil formed of a tubular conductor 56. This is wrapped spirally around the spider and held in place by means of the notched bars. The conductor 56 is the primary coil of a transformer. The ends of the coil 56 are connected to terminals 57, 57 in the end plate 52. These terminals 57 are connected by means of leads 58, 58 to a source of alternating electric current. By means of this connection high frequency alternating current of the order of 525 kilocycles is stepped down to provide the desired low voltage and high amperage for maximum induction heating.

The coil 56 and leads 58 are tubular in order to permit a circulation of cooling water and thus provide the desired voltage and high amperage for dissipate the heating effect produced by the current in the primary coil.

A shell 59 of generally cylindrical form preferably of copper surrounds the primary coil 56 and forms the secondary of the transformer. At the bottom it is split longitudinally to provide independent connections to two radially extending fins 60, 60. These fins are separated by an insulating spacer 61 of glass bonded mica. This separator is in line with the shoe 48.

A coil 62 of tubing is formed around the shell 59 and the ends are connected respectively to an inlet header 63 and an outlet header 64. The inlet header is connected to a non-conductive tube 65 by which cooling water or the like is supplied to the header and to the coil 62. The outlet header 64 has a fitting 66 from which a hollow tubular induction coil 67 extends down to and immediately above the path of movement of the work through the heating unit. This induction coil lies in a rabbet 69 at the right of the shoe 48, as shown in Figure 5. The return section of the coil 67 lies in the rabbet 70. These two sections of the coil are held spaced from each other by the depending portion of the shoe and they are also so placed on the shoe that they are spaced above the work. The two sections extend parallel with the path of travel of the side seam that is to be bonded and are spaced laterally so as to be substantially directly above the outer limits of the side seam so that the heating created by the induction coil is confined largely to the heating of the metal parts within the side seam and this avoids overheating and burning the thin metal at opposite sides of the seam. The same is true when a can body having lock and lap sections is mounted in the conveyor and passed beneath the heating unit. The sections of the induction coil which extend lengthwise of the path of travel of the seam are so spaced as to be substantially directly over the extreme limits of the interlocked parts of the seam and also within the limits of the lap portions of the seam.

The depending portion of the foot 48 contacts with the lap sections of the side seam, as shown in Figure 5, when the can body is passed beneath the heating unit. The sections are held in their lapped position by the clamping members 34, 34. However, the foot pressing on the lap sections longitudinally of the side seam will hold the lap portions in intimate contact with the bonding material and this will aid in the distribution of the bonding material when it is reduced to fluid condition.

The same is largely true of a lock and lap seam, particularly the lap portions of such a seam. The foot bearing on the seam with a light pressure will insure that the metal parts are held in intimate contact with the bonding material and bring about a uniform distribution of the bonding material when it is reduced to fluid form. The pressure of the shoe 48 may be adjusted by means of the adjustment of the bolts 45.

The pressure device consists of a saddle 71 having a top 72 and vertical side legs 73. The latter are slotted as shown in 74 and thus held by means of adjustable bolts 75 to the side rails of the frame. Cross bars 76, 76 suspended beneath the saddle top 72, form supports for fixed parallel angle irons 77, 77 which are spaced from each other. These angle irons are vertically slotted as at 78 to receive transverse journals 79. These journals are attached to bolts 80, 80 which extend up through holes in the angle irons 77. Compression springs 81 on the bolts between the journals and the angle irons exert a downward pressure on the journal. Stop nuts 82 limit the downward movement of the journals, when there is no can body present.

Each of the journals 79 has a presser roller 83 sufficiently large in diameter to engage the upper side of the side seam as it is moved beneath the same.

There are a series of these presser rolls and they are arranged so that the side seam as it leaves the shoe 48 of the heating unit will be contacted by the presser rolls one after another. The extent of the pressure is determined by the tension placed on the springs 81. The time period of the pressure applied to the side seam should be sufficient to hold the metal parts of the side seam in intimate contact with the bonding material until it has set and the bonding of the parts completed.

In Figure 7 of the drawings, there is shown on an enlarged scale a sectional view through a lap side seam bonded with solder by the improved method and in Figure 8 there is shown a similar view of a lock seam solder bonded by the improved method. It is understood that the method described, however, is not limited to the bonding of a side seam of either the lap or lock and lap type, as illustrated in Figures 7 and 8, but the method may be employed in the bonding of any type of side seam wherein the metal parts are joined by a bonding material.

It will also be understood that the improved method is not limited to the employment of the specific form of apparatus illustrated but may be used in connection with any well known type of body maker wherein the body blanks are prepared, shaped into body form, the edges of the body blank brought together for seam formation, and then permanently joined and sealed by a bonding material.

One of the most important advantages in the employment of the method described above is the rapid speed at which the bonding of the side seam can be accomplished. This is due in part to the character of the heating unit used wherein the heat utilized in the bonding of the seam is created by induction heating within the metal parts of the seam which are to be bonded together. The heating coil can be positioned so that the heating field can be concentrated on the portions of the side seam which will bring about a rapid heating of the seamed parts and the bonding material confined therein. This rapid bonding of the side seam is also due in part to the confining of the bonding material within the seamed parts. In completing a solder bonded side seam by this arrangement of the bonding material and the employment of this type of heating unit, the solder does not have to be raised to anywhere near the temperature required where solder is applied to the outside of the seam and sweated into the seam. Due to the fact that the temperature necessary for bonding is relatively low, the cooling of the parts to set the bonding material may be much more quickly accomplished. By the improved method the bonding of a side seam can be accomplished in a very few seconds.

Another advantage of the improved method is in the saving of the bonding material. When the bonding material is applied to the outer surface of the can body at the side seam and sweat into the seam, much of the bonding material clings to the body and is wasted. The wiping of the solder from the body after bonding recovers only a portion of the solder and has many objections which have been noted above. By the present method, the wiping of the can body after solder bonding is done away with, and also the waste of solder which cannot be reclaimed. Furthermore, when the bonding material is within the limits of the side seam, very much less solder bonding material is necessary in order to produce a uniform seam of maximum strength. In fact, with tinplate having a heavy coating of tin, the tin coating may be utilized in the bonding of the side seam when the improved method is utilized.

When the improved method is employed, the apparatus for carrying out the same may be greatly simplified over that necessary for the preheating of the side seam, the sweating of the solder into the side seam, and again preheating and wiping for reclaiming solder.

It is obvious that many changes may be made in the method steps and in the heating unit, the conveying means and the means for maintaining the seam parts in contact with the bonding material until set as described, without departing from the spirit of the invention as set forth in the appended claims.

We claim:

1. The method of forming a can body from a sheet metal blank consisting in applying to the blank at the portions thereof which are to be joined in a side seam a heat fusible bonding material consisting of solder flux and solder so that said material will be positioned wholly within the limits of the side seam and between the parts to be joined, passing the can body thus formed through an induction heating zone for melting the solder, holding the seam parts under pressure during the melting of the solder for distributing said solder throughout all parts of the seam and immediately passing the can body through a cooling zone and retaining the seam parts under pressure until the solder is cooled and set and the bond completed.

2. An apparatus for bonding the side seam of a can body having a heat fusible bonding material disposed within the limits of the side seam comprising a heating zone and a cooling zone and means for conveying a can body through said zones in succession, said heating zone including an induction heating element having spaced portions extending parallel to the direction of can body travel for heating the side seam and causing the fusible material therein to flow, and pressure means independent of the heating element and disposed between the spaced portions thereof for holding the seam parts in intimate contact while heating the fusible material, said cooling zone including a series of rollers arranged in tandem and operating to retain the seam parts in intimate contact until the fusible bonding material is set.

ALLAN M. CAMERON.
SCOTT R. JOHNSON.

REFERENCES CITED

The following references are of record in the file of this patent:

UNITED STATES PATENTS

| Number | Name | Date |
|---|---|---|
| 1,019,376 | Sleeper | Mar. 5, 1912 |
| 1,205,512 | Butcher | Nov. 21, 1916 |
| 1,748,551 | Helle | Feb. 25, 1930 |
| 2,184,280 | Clark | Dec. 26, 1939 |
| 2,271,780 | Sebell | Feb. 3, 1942 |
| 2,279,854 | Whitney | Apr. 14, 1942 |
| 2,385,904 | Witty | Oct. 2, 1945 |
| 2,460,687 | Fuchs | Feb. 1, 1949 |

FOREIGN PATENTS

| Number | Country | Date |
|---|---|---|
| 234,373 | Great Britain | May 28, 1925 |

OTHER REFERENCES

Bulletin No. 12-A, pages 15 and 17 (1943), Handy and Harman, 82 Fulton Street, New York, New York.